United States Patent
Fukatsu et al.

(10) Patent No.: US 8,844,692 B2
(45) Date of Patent: Sep. 30, 2014

(54) FLUID PRESSURE CONTROL DEVICE

(75) Inventors: Akira Fukatsu, Anjo (JP); Hiroshi Tanaka, Hekinan (JP); Toshiaki Hayashi, Anjo (JP); Toshihiro Aoyama, Toyota (JP)

(73) Assignees: Aisin Aw Co., Ltd., Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 371 days.

(21) Appl. No.: 13/238,933

(22) Filed: Sep. 21, 2011

(65) Prior Publication Data

US 2012/0073924 A1  Mar. 29, 2012

(30) Foreign Application Priority Data

Sep. 28, 2010  (JP) ................. 2010-216537

(51) Int. Cl.
  *F16H 61/14*  (2006.01)
  *F16H 33/18*  (2006.01)
(52) U.S. Cl.
  USPC ........................................................ 192/3.3
(58) Field of Classification Search
  USPC .................................. 192/3.29, 3.3
  See application file for complete search history.

(56) References Cited

U.S. PATENT DOCUMENTS

| | | | |
|---|---|---|---|
| 4,560,043 A * | 12/1985 | Murasugi et al. | ............ 192/3.31 |
| 4,871,793 A | 10/1989 | Nakahara et al. | |
| 5,435,211 A * | 7/1995 | Matsumoto et al. | ........... 192/3.3 |
| 2010/0018822 A1 | 1/2010 | Soga | |

FOREIGN PATENT DOCUMENTS

| | | |
|---|---|---|
| JP | 60-184763 A | 9/1985 |
| JP | 60-184763 A | 9/1985 |
| JP | 63-172058 A | 7/1988 |
| JP | 63-172058 A | 7/1988 |
| JP | 4-331870 A | 11/1992 |
| JP | 4-331870 A | 11/1992 |
| JP | 5-322034 A | 12/1993 |
| JP | 2008-169938 A | 7/2008 |

OTHER PUBLICATIONS

International Search Report for corresponding International Patent Application No. PCT/JP2011/071450 mailed on Dec. 6, 2011.

\* cited by examiner

*Primary Examiner* — Jacob S Scott
(74) *Attorney, Agent, or Firm* — Sughrue Mion, PLLC (57) ABSTRACT

A fluid pressure control device controls input and output of a fluid pressure to and from a fluid chamber in a device that transfers power from a motor via working fluid in the chamber, the chamber being partitioned into engagement and disengagement oil chambers by a lock-up clutch. A signal pressure output valve performs pressure regulation to output a signal pressure. The control device includes a control valve connected to an output source flow passage leading to an output source of the fluid pressure, and a control unit controlling the signal pressure output valve so the control valve establishes a first state when the lock-up clutch is turned off, establishes a third state when the lock-up clutch is turned on, and establishes a second state so the working fluid can be confined in the disengagement oil chamber when the lock-up clutch is switched on.

7 Claims, 5 Drawing Sheets

DISCHARGE-ENABLED STATE

FLUID PRESSURE CONTROL DEVICE

INCORPORATION BY REFERENCE

The disclosure of Japanese Patent Application No. 2010-216537 filed on Sep. 28, 2010 including the specification, drawings and abstract is incorporated herein by reference in its entirety.

BACKGROUND OF THE INVENTION

The present invention relates to a fluid pressure control device, and more particularly to a fluid pressure control device that controls input and output of a fluid pressure to and from a fluid chamber in a fluid transfer device that transfers power from a motor via a working fluid in the fluid chamber, the fluid chamber being partitioned into an engagement oil chamber and a disengagement oil chamber by a lock-up clutch, the lock-up clutch being turned off by inputting the fluid pressure to the disengagement oil chamber and discharging the fluid pressure from the engagement oil chamber, and the lock-up clutch being turned on by stopping input of the fluid pressure to the disengagement oil chamber and inputting the fluid pressure to the engagement oil chamber.

DESCRIPTION OF THE RELATED ART

As an example of this type of fluid pressure control device according to the related art, there is proposed a hydraulic control device that performs hydraulic control using a switching valve that selectively allows and blocks input of working oil to an engagement oil chamber and a disengagement oil chamber in a torque converter that transfers power input from an engine of a vehicle to an input shaft to an output shaft via the working oil in an oil chamber and that includes a lock-up clutch which partitions the oil chamber into the engagement oil chamber on the input shaft side and the disengagement oil chamber on the output shaft side and which can directly couple the input shaft and the output shaft to each other (see Japanese Patent Application Publication No. 2008-169938, for example). In the device, the lock-up clutch is engaged by switching the switching valve so as to input the working oil to the engagement oil chamber and stop input of the working oil to the disengagement oil chamber in order to cause a pressure difference between the oil chambers in the case where predetermined conditions are established, such as in the case where the difference in rotational speed between input and output is a predetermined value or less. Meanwhile, the lock-up clutch is disengaged by switching the switching valve so as to input the working oil to the disengagement oil chamber and output the working oil from the engagement oil chamber in the case where the predetermined conditions are not established.

SUMMARY OF THE INVENTION

In response to a request to further improve the power transfer efficiency of the torque converter in recent years, engagement of the lock-up clutch tends to be initiated in a situation where the difference in rotational speed between input and output is relatively large such as immediately after the vehicle starts traveling. For the purpose of smoothly engaging the lock-up clutch in such a situation, a hydraulic control device that performs hydraulic control using a control valve which controls the hydraulic pressure in the disengagement oil chamber in addition to the switching valve is proposed. In such a device, the control valve is configured such that a regulated signal pressure is input so that a larger amount of the working oil is discharged from the disengagement oil chamber as the signal pressure increases, and such that a larger feedback force that urges discharge of a larger amount of the working oil from the disengagement oil chamber acts as a higher hydraulic pressure acts on the disengagement oil chamber. In order to turn the lock-up clutch from off to on, working oil from the same source pressure is supplied to the engagement oil chamber and the disengagement oil chamber, and the working oil in the disengagement oil chamber is gradually discharged from such a state to gradually increase the pressure difference between the oil chambers, which engages the lock-up clutch.

In a situation where the difference in rotational speed between input and output is relatively large as discussed above, however, a centrifugal oil pressure produced in the working oil in the engagement oil chamber on the input shaft side is increased because of the difference in rotational speed, which may depress the lock-up clutch toward the disengagement oil chamber side. In this case, the hydraulic pressure in the disengagement oil chamber becomes higher, and therefore a larger feedback force that urges discharge of the working oil from the disengagement oil chamber acts on the control valve. Therefore, the lock-up clutch is engaged with discharge of the working oil from the disengagement oil chamber urged more than necessary, which may produce an engagement shock.

A main object of a fluid pressure control device according to the present invention is to suppress an engagement shock of a lock-up clutch that is turned on by a pressure difference between an engagement oil chamber and a disengagement oil chamber.

In order to achieve the foregoing main object, the fluid pressure control device according to the present invention adopts the following means.

A fluid pressure control device according to a first aspect of the present invention controls input and output of a fluid pressure to and from a fluid chamber in a fluid transfer device that transfers power from a motor via a working fluid in the fluid chamber, the fluid chamber being partitioned into an engagement oil chamber and a disengagement oil chamber by a lock-up clutch, the lock-up clutch being turned off by inputting the fluid pressure to the disengagement oil chamber and discharging the fluid pressure from the engagement oil chamber, and the lock-up clutch being turned on by stopping input of the fluid pressure to the disengagement oil chamber and inputting the fluid pressure to the engagement oil chamber. The fluid pressure control device includes: a signal pressure output valve that performs pressure regulation to output a signal pressure; a control valve that is connected to an output source flow passage leading to an output source of the fluid pressure, a disengagement-oil-chamber flow passage leading to the disengagement oil chamber, and a drain passage, and that switchably establishes, in accordance with the signal pressure from the signal pressure output valve, a first state in which communication between the output source flow passage and the disengagement-oil-chamber flow passage is allowed and communication between the disengagement-oil-chamber flow passage and the drain passage is blocked, a second state in which communication between the output source flow passage and the disengagement-oil-chamber flow passage is blocked and communication between the disengagement-oil-chamber flow passage and the drain passage is blocked, and a third state in which communication between the output source flow passage and the disengagement-oil-chamber flow passage is blocked and communication between the disengagement-oil-chamber flow passage and the drain passage is allowed; and a control unit that controls the signal pressure output valve such that the control valve establishes the first state when the lock-up clutch is turned off, controlling the signal pressure output valve such that the control valve establishes the third state when the lock-up clutch is turned on, and controlling the signal pressure output valve such that the control valve establishes the second state so that the working fluid can be confined in the disengagement oil chamber when the lock-up clutch is switched from off to on.

In the fluid pressure control device according to the first aspect, the signal pressure output valve is controlled such that the control valve establishes the first state in which communication between the output source flow passage and the disengagement-oil-chamber flow passage is allowed and communication between the disengagement-oil-chamber flow passage and the drain passage is blocked when the lock-up clutch is turned off, the signal pressure output valve is controlled such that the control valve establishes the third state in which communication between the output source flow passage and the disengagement-oil-chamber flow passage is blocked and communication between the disengagement-oil-chamber flow passage and the drain passage is allowed when the lock-up clutch is turned on, and the signal pressure output valve is controlled such that the control valve establishes the second state in which communication between the output source flow passage and the disengagement-oil-chamber flow passage is blocked and communication between the disengagement-oil-chamber flow passage and the drain passage is blocked so that the working fluid can be confined in the disengagement oil chamber when the lock-up clutch is switched from off to on. This makes it is possible to prevent the lock-up clutch from being turned on with discharge of the working oil from the disengagement oil chamber urged more than necessary when the lock-up clutch is switched from off to on. As a result, it is possible to suppress an engagement shock of the lock-up clutch which is turned on by a pressure difference between the engagement oil chamber and the disengagement oil chamber.

The fluid pressure control device according to a second aspect of the present invention may further include a switching valve that switches to a state in which communication through a flow passage linking the output source and the engagement oil chamber to each other is blocked when the lock-up clutch is turned off, and that switches to a state in which communication through the flow passage linking the output source and the engagement oil chamber to each other is allowed when the lock-up clutch is turned on.

In the fluid pressure control device according to a third aspect, the control valve may include a spool that can switch between the various states, the spool being positioned at one movement end of a movable range in an initial state and being movable from the one movement end to the other movement end by applying to the spool not only the signal pressure from the signal pressure output valve but also the fluid pressure in the disengagement oil chamber, as a feedback force, in the same direction as a direction of application of the signal pressure, and the first state being established when the spool is positioned in a first range including the one movement end of the movable range, the third state being established when the spool is positioned in a third range including the other movement end, and the second state being established when the spool is positioned in a second range provided between the first range and the third range, the second range being determined such that the second state is established in the case where the fluid pressure from the output source is applied as the feedback force, in addition to the signal pressure from the signal pressure output valve, when the lock-up clutch is switched from off to on, and such that the second state is maintained even in the case where a fluid pressure exceeding the fluid pressure from the output source is applied as the feedback force. With this configuration, communication between the disengagement-oil-chamber flow passage and the drain passage can be kept blocked even if the fluid pressure in the disengagement oil chamber exceeds the fluid pressure of the output source to increase the feedback force to move the spool. Thus, it is possible to prevent the lock-up clutch from being turned on with discharge of the working oil from the disengagement oil chamber urged more than necessary as the feedback force increases during standby.

In the fluid pressure control device according to a fourth aspect of the present invention, further, the control unit may be a unit that controls the signal pressure output valve such that the control valve switches from the first state to the second state, stands by in the second state, and thereafter switches to the third state so that the fluid pressure from the output source is applied to both the engagement oil chamber and the disengagement oil chamber, stands by in such a state, and thereafter is discharged from the disengagement oil chamber when the lock-up clutch is switched from off to on.

In the fluid pressure control device according to a fifth aspect, the control valve may be formed with an input port connected to the output source flow passage, an output port connected to the disengagement-oil-chamber flow passage, and a drain port connected to the drain passage, which are arranged in an order of the input port, the output port, and the drain port along an axial direction, and the spool may be formed with a first land, a second land, and a reduced-diameter portion that couples the lands to each other, which are arranged in an order of the first land, the reduced-diameter portion, and the second land, a length of the reduced-diameter portion being determined such that the second land blocks the drain port and communication between the input port and the output port is allowed via the reduced-diameter portion when the spool is in the first range, the first land blocks the input port and communication between the output port and the drain port is allowed via the reduced-diameter portion when the spool is in the third range, and the first land blocks the input port and the second land blocks the drain port when the spool is in the second range. With this configuration, the working oil can be confined in a space surrounded by the first land, the second land, the reduced-diameter portion, and the inner wall of the control valve and leading to the disengagement oil chamber of the lock-up clutch via the output port and the disengagement-oil-chamber flow passage in the second state. Therefore, it is possible to prevent the lock-up clutch from being excessively depressed with the working oil confined in the space leading to the disengagement oil chamber even in the case where a higher centrifugal oil pressure acts on the working fluid in the engagement oil chamber than on the working fluid in the disengagement oil chamber to depress the lock-up clutch toward the disengagement oil chamber to increase the feedback force acting on the spool, for example.

In the fluid pressure control device according to a sixth aspect of the present invention, the control valve may be configured such that the first land overlaps a part of the input port and the second land overlaps a part of the output port when the spool is positioned at the one movement end, and the length of the reduced-diameter portion may be determined such that an opening area of the input port and an opening area of the output port are equal to each other in such a state. With this configuration, the working oil input from the output source flow passage via the input port can be smoothly output to the disengagement-oil-chamber flow passage via the output port even in a configuration in which the working oil can be confined. In the fluid pressure control device according to a seventh aspect of the present invention, the control valve may be configured such that the first land overlaps a part of the output port and the second land overlaps a part of the drain port when the spool is positioned at the other movement end, and the length of the reduced-diameter portion may be determined such that an opening area of the output port and an opening area of the drain port are equal to each other in such a state. With this configuration, the working oil in the disengagement-oil-chamber flow passage input via the output port can be smoothly discharged to the drain passage via the drain port even in a configuration in which the working oil can be confined.

DETAILED DESCRIPTION OF THE EMBODIMENTS

An embodiment of the present invention will be described below.

Figure 1:
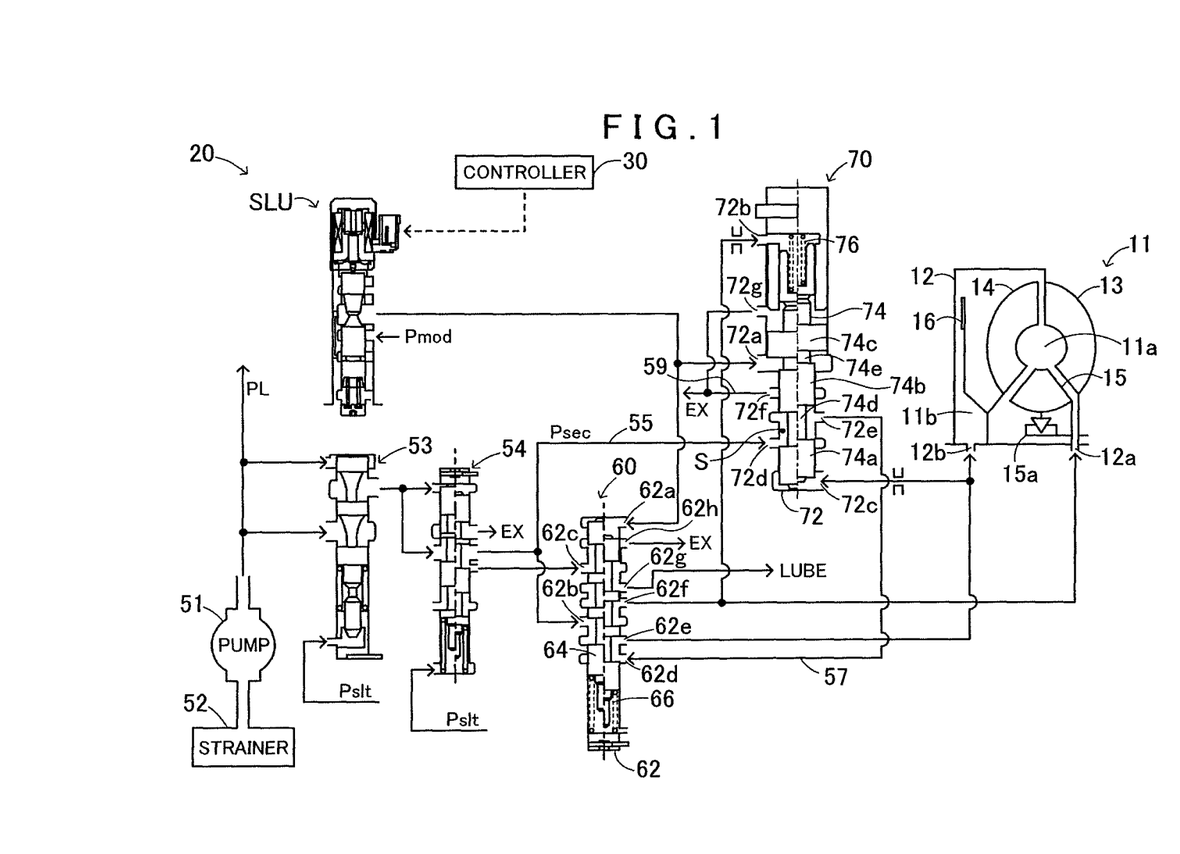
FIG. 1 is a diagram showing a schematic configuration of a hydraulic control device 20.

FIG. 1 is a diagram showing a schematic configuration of a hydraulic control device 20 according to an embodiment of the present invention. The hydraulic control device 20 according to the embodiment is formed as a device that is provided in an automobile incorporating an engine (not shown) and an automatic transmission (not shown) and that controls the hydraulic pressure of a torque converter 11 to which engine torque output to a crankshaft of the engine is input and which transfers the input torque to an input shaft of the automatic transmission.

The torque converter 11 includes a pump impeller 13 connected to the crankshaft via a converter cover 12, a turbine runner 14 connected to the input shaft and disposed opposite the pump impeller 13, a stator 15 which is disposed between the pump impeller 13 and the turbine runner 14 and to which a one-way clutch 15a that allows rotation only in one direction is attached, and a lock-up clutch 16 that directly couples the pump impeller 13 (converter cover 12) and the turbine runner 14 to each other. Transfer of torque through the torque converter 11 is performed by the pump impeller 13 converting the engine torque into a flow of working oil and the turbine runner 14 converting the flow of the working oil into torque on the input shaft of the automatic transmission. An oil chamber in the torque converter 11 is partitioned by the lock-up clutch 16 into an engagement oil chamber 11a and a disengagement oil chamber 11b. An engagement-oil-chamber port 12a through which the working oil is input to and output from the engagement oil chamber 11a and a disengagement-oil-chamber port 12b through which the working oil is input to and output from the disengagement oil chamber 11b are formed. In the torque converter 11, the lock-up clutch 16 is engaged (turned on) and disengaged (turned off) in accordance with a pressure difference between the hydraulic pressure in the engagement oil chamber 11a and the hydraulic pressure in the disengagement oil chamber 11b. As discussed in detail later, the lock-up clutch 16 is disengaged when the working oil is input to the disengagement oil chamber 11b via the disengagement-oil-chamber port 12b and the working oil is discharged from the engagement oil chamber 11a via the engagement-oil-chamber port 12a by the hydraulic control device 20. Meanwhile, the lock-up clutch 16 is engaged when the working oil is input to the engagement oil chamber 11a via the engagement-oil-chamber port 12a and input of the working oil from the disengagement-oil-chamber port 12b to the disengagement oil chamber 11b is stopped. When the lock-up clutch 16 is engaged, the pump impeller 13 on the input side and the turbine runner 14 on the output side are directly coupled to each other so that the engine torque is mechanically and directly transferred to the input shaft of the automatic transmission.

As shown in FIG. 1, the hydraulic control device 20 includes a mechanical oil pump 51 driven by power from the engine to pump the working oil via a strainer 52, a primary regulator valve 53 driven by a signal pressure Pslt from a linear solenoid SLT (not shown) to regulate the pressure of the working oil pumped from the mechanical oil pump 51 to generate a line pressure PL, a secondary regulator valve 54 driven by the signal pressure Pslt from the linear solenoid SLT (not shown) to regulate the pressure of the working oil output from the primary regulator valve 53 along with the generation of the line pressure PL to generate a secondary pressure Psec, a switching valve 60 that switches between an oil passage that inputs the secondary pressure Psec to the engagement oil chamber 11a via the engagement-oil-chamber port 12a and an oil passage that inputs the secondary pressure Psec to the disengagement oil chamber 11b via the disengagement-oil-chamber port 12b, a control valve 70 that controls the hydraulic pressure in the disengagement oil chamber 11b, a linear solenoid SLU that receives and regulates a modulator pressure Pmod to output a signal pressure for driving the switching valve 60 and the control valve 70, and a controller 30 that drivably controls the linear solenoid SLU. Although not shown, the controller 30 is formed as a microprocessor including a CPU as its main component, and includes a ROM that stores a processing program, a RAM that temporarily stores data, and so forth in addition to the CPU. The line pressure PL is used to control engagement pressures for friction engagement elements such as clutches and brakes provided in the automatic transmission.

The switching valve 60 includes a sleeve 62 formed with various ports, a spool 64 that slides in the sleeve 62 in the axial direction, and a spring 66 that urges the spool 64 in the axial direction. The sleeve 62 is formed with: a signal pressure port 62a that receives the signal pressure from the linear solenoid SLU as a signal pressure for pressing the spool 64 in the opposite direction to the urging force of the spring 66; an input port 62b that receives the secondary pressure Psec; an input port 62c that receives the working oil discharged from the secondary regulator valve 54 along with the generation of the secondary pressure Psec; an input port 62d that receives the working oil from a communication oil passage 57 coupled to the control valve 70; an output port 62e connected to the disengagement-oil-chamber port 12b of the disengagement oil chamber 11b; an output port 62f connected to the engagement-oil-chamber port 12a of the engagement oil chamber 11a; an output port 62g connected to an object to be lubricated LUBE of the automatic transmission via a cooler (not shown); and a drain port 62h that discharges the working oil.

In the switching valve 60, in the case where the linear solenoid SLU is turned off, the spool 64 is moved to a position indicated on the left half in FIG. 1 (hereinafter referred to as an "off position") by the urging force of the spring 66. At this time, communication between the input port 62b and the output port 62e is allowed, communication between the input port 62c and the drain port 62h is allowed, and communication between the output port 62f and the output port 62g is allowed. Meanwhile, communication between the input port 62b and the output port 62f is blocked, communication between the input port 62c and the output port 62g is blocked, and communication between the input port 62d and the output port 62e is blocked. Therefore, the secondary pressure Psec from the secondary regulator valve 54 is input to the disengagement oil chamber 11b via the input port 62b, the output port 62e, and the disengagement-oil-chamber port 12b, the working oil in the engagement oil chamber 11a is output to the object to be lubricated LUBE via the engagement-oil-chamber port 12a, the output port 62f, and the output port 62g, and the working oil discharged from the secondary regulator valve 54 along with the generation of the secondary pressure Psec is discharged via the input port 62c and the drain port 62h. An oil passage for disengagement of the lock-up clutch 16 is thus formed.

In the case where the linear solenoid SLU is turned on, on the other hand, the spool 64 is moved to a position indicated on the right half in FIG. 1 (hereinafter referred to as an "on position") with the signal pressure from the linear solenoid SLU overcoming the urging force of the spring 66. At this time, communication between the input port 62b and the output port 62f is allowed, communication between the input port 62c and the output port 62g is allowed, and communication between the input port 62d and the output port 62e is allowed. Meanwhile, communication between the input port 62b and the output port 62e is blocked, communication between the input port 62c and the drain port 62h is blocked, and communication between the output port 62f and the output port 62g is blocked. Therefore, the secondary pressure Psec from the secondary regulator valve 54 is input to the engagement oil chamber 11a via the input port 62b, the output port 62f, and the engagement-oil-chamber port 12a, the disengagement oil chamber 11b is communicated with the communication oil passage 57 via the disengagement-oil-chamber port 12b, the output port 62e, and the input port 62d, and the working oil discharged from the secondary regulator valve 54 along with the generation of the secondary pressure Psec is output to the object to be lubricated LUBE via the input port 62c and the output port 62g. As discussed in detail later, the control valve 70 allows the working oil to be output to the communication oil passage 57, and allows the working oil in the communication oil passage 57 to be discharged. When the working oil in the communication oil passage 57 is discharged, the working oil in the disengagement oil chamber 11b, which is in communication with the communication oil passage 57, is also discharged. Thus, an oil passage for engagement of the lock-up clutch 16 is formed.

The control valve 70 includes a sleeve 72 formed with various ports, a spool 74 disposed so as to be freely slidable in the axial direction in the sleeve 72, and a spring 76 that urges the spool 74 in the axial direction. The spool 74 is formed as a shaft-like member including a small-diameter land 74a formed at the lower shaft end in FIG. 1, a small-diameter land 74b that is equal in diameter to the small-diameter land 74a, a large-diameter land 74c that is larger in outside diameter than the small-diameter lands 74a and 74b, a coupling portion 74d that couples the small-diameter land 74a and the small-diameter land 74b to each other, and a coupling portion 74e that couples the small-diameter land 74b and the large-diameter land 74c to each other. The sleeve 72 is formed with: a signal pressure port 72a that inputs the signal pressure from the linear solenoid SLU to a space defined by the small-diameter land 74b, the large-diameter land 74c, and the coupling portion 74e of the spool 74 and the inner wall of the sleeve 72; a feedback port 72b that receives via an orifice a hydraulic pressure PlupON acting on the engagement oil chamber 11a as a feedback force for pressing the spool 74; a feedback port 72c that receives via an orifice a hydraulic pressure PlupOFF acting on the disengagement oil chamber 11b as a feedback force for pressing the spool 74; an input port 72d that inputs the secondary pressure Psec output from the secondary regulator valve 54 to a supply oil passage 55 to a space S defined by the small-diameter lands 74a and 74b and the coupling portion 74d of the spool 74 and the inner wall of the sleeve 72; an output port 72e that outputs to the communication oil passage 57 the secondary pressure Psec input from the input port 72d to the space S and that is connected to the input port 62d of the switching valve 60 via the communication oil passage 57; a drain port 72f that discharges the working oil in the space S to a drain oil passage 59; and a drain port 72g that discharges the working oil leaking out from a sliding surface between the large-diameter land 74c and the inner wall surface of the sleeve 72.

In the control valve 70, the signal pressure from the linear solenoid SLU input to the signal pressure port 72a acts on the spool 74 in the opposite direction to the urging force of the spring 76 because of a pressure difference due to the difference in diameter (difference in pressure receiving area) between the small-diameter land 74b and the large-diameter land 74c. The feedback force produced by the hydraulic pressure PlupON input to the feedback port 72b acts on the spool 74 in the same direction as the urging force of the spring 76. The feedback force produced by the hydraulic pressure PlupOFF input to the feedback port 72c acts on the spool 74 in the opposite direction to the urging force of the spring 76. Therefore, the spool 74 is moved in accordance with the balance relationship among the urging force of the spring 76, the feedback force produced by the hydraulic pressure PlupON acting on the spool 74 in the same direction as the urging force of the spring 76, the feedback force produced by the hydraulic pressure PlupOFF acting on the spool 74 in the opposite direction to the urging force of the spring 76, and a force produced by the signal pressure from the linear solenoid SLU acting on the spool 74 in the opposite direction to the urging force of the spring 76. FIGS. 2A, 2B, 2C, 2D, and 2E illustrate variations in state of the control valve 70 due to movement of the spool 74. As shown in the drawing, the state of the control valve 70 varies along with the movement of the spool 74 as shown in FIGS. 2A to 2E. The various states of control valve 70 will be described below in order. The position of the spool 74 is described with respect the position of an end surface of the shaft end at which the small-diameter land 74a is formed, with an X coordinate defined in the axial direction of the spool 74.

Figure 2A:
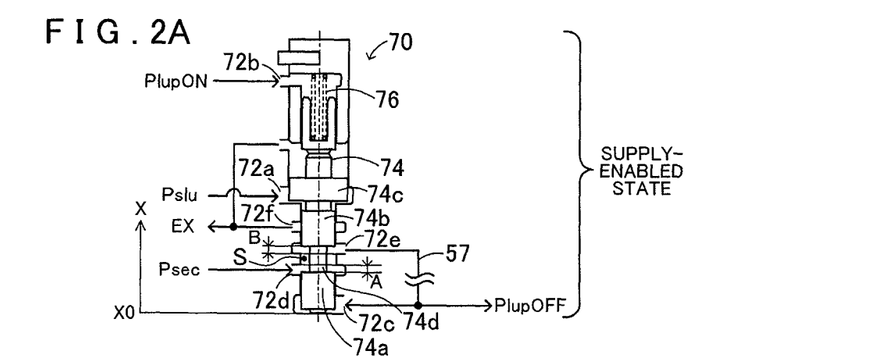
FIGS. 2A, 2B, 2C, 2D and 2E illustrate variations in state of a control valve 70 due to movement of a spool 74.

FIG. 2A shows a state of the control valve 70 with the linear solenoid SLU turned off and the spool 74 at an initial position X0 (movement end). This state is the same as the state with the spool 74 at the position indicated on the left half in FIG. 1. At this time, communication between the input port 72d and the output port 72e is allowed to allow communication between the supply oil passage 55 and the communication oil passage 57, and communication between the output port 72e and the drain port 72f is blocked to block communication between the communication oil passage 57 and the drain oil passage 59. Therefore, the secondary pressure Psec output from the secondary regulator valve 54 to the supply oil passage 55 is supplied to the communication oil passage 57 via the input port 72d and the output port 72e. In the case where the linear solenoid SLU is turned off, the spool 64 of the switching valve 60 is at the off position, and the input port 62d connected to the communication oil passage 57 is blocked. Thus, the secondary pressure Psec supplied to the communication oil passage 57 is charged in the communication oil passage 57. When the linear solenoid SLU is turned on to move the spool 64 of the switching valve 60 to the on position, however, the secondary pressure Psec can be supplied to the disengagement oil chamber 11b via communication between the input port 62d and the output port 62e. Therefore, the state shown in FIG. 2A is referred to as a "supply-enabled state" (which corresponds to the "first state" according to the present invention). In the case where the spool 74 is at the initial position X0 as shown in FIG. 2A, a part of the small-diameter land 74a overlaps the input port 72d, and a part of the small-diameter land 74b overlaps the output port 72e. A length L (see FIG. 2B) of the coupling portion 74d, which couples the small-diameter land 74a and the small-diameter land 74b to each other, is determined such that the opening area of the input port 72d and the opening area of the output port 72e are equal to each other, that is, an opening width A of the input port 72d and an opening width B of the output port 72e are equal to each other, in this state. This allows the working oil input to the space S via the input port 72d to be smoothly output from the output port 72e.

Figure 2B:
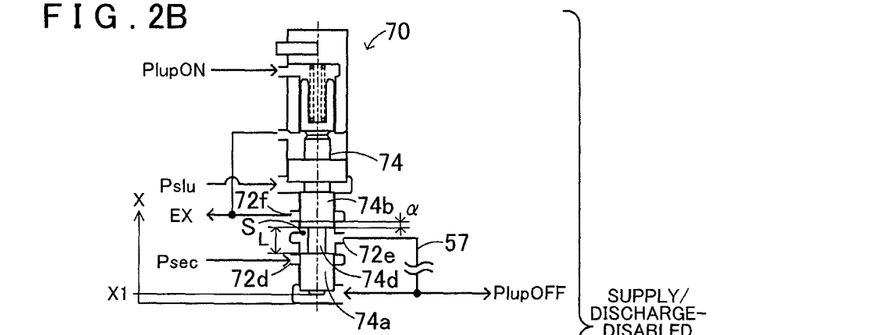
Figure 2C:
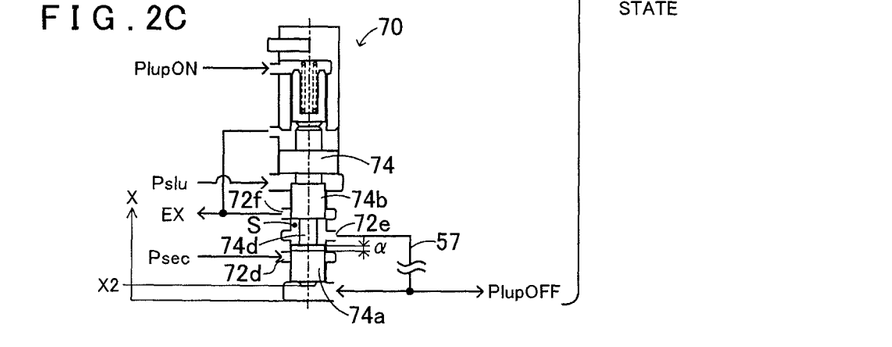

FIGS. 2B to 2E show states of the control valve 70 after the linear solenoid SLU is turned on. FIG. 2B shows a state in which the spool 74 has been moved from the initial position X0 to a position X1. At this time, communication between the input port 72d and the output port 72e is blocked to block communication between the supply oil passage 55 and the communication oil passage 57, and communication between the output port 72e and the drain port 72f is blocked to block communication between the communication oil passage 57 and the drain oil passage 59. Although the opening of the input port 72d is gradually reduced by the small-diameter land 74a as the spool 74 moves from the initial position X0 to the position X1, the secondary pressure Psec is supplied to the communication oil passage 57. That is, the control valve 70 is in the supply-enabled state in a range over which the spool 74 moves from the initial position X0 to the position X1 (which corresponds to the "first range" according to the present invention). Next, FIG. 2C shows a state in which the spool 74 has moved to a position X2, which is an amount of movement α away from the position X1. Also in this case, communication between the input port 72d and the output port 72e is blocked, and communication between the output port 72e and the drain port 72f is blocked. Thus, communication between the input port 72d and the output port 72e is blocked and communication between the output port 72e and the drain port 72f is blocked for a period for which the spool 74 moves from the position X1 to the position X2 over a distance of the amount of movement α. This results in a state in which the secondary pressure Psec is not input to the space S (communication oil passage 57) and the working oil in the space S (communication oil passage 57) is not discharged, that is, a state in which the secondary pressure Psec is not supplied to the disengagement oil chamber 11b and the working oil in the disengagement oil chamber 11b is not discharged. Therefore, a state between the states shown in FIGS. 2B and 2C in which the spool 74 is in a range between the position X1 and the position X2 (which corresponds to the "second range" according to the present invention) is referred to as a "supply/discharge-disabled state" (which corresponds to the "second state" according to the present invention).

Figure 2D:
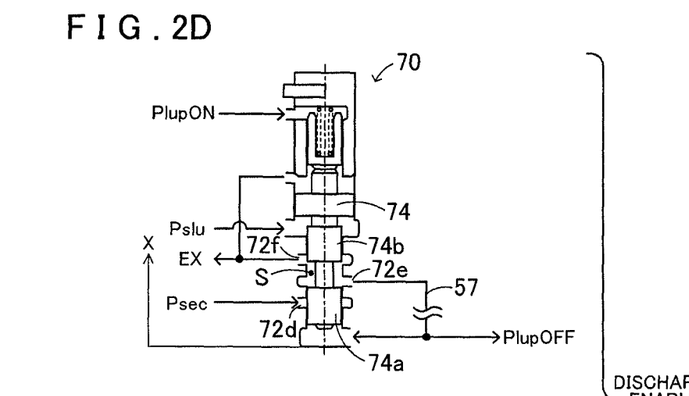
Figure 2E:
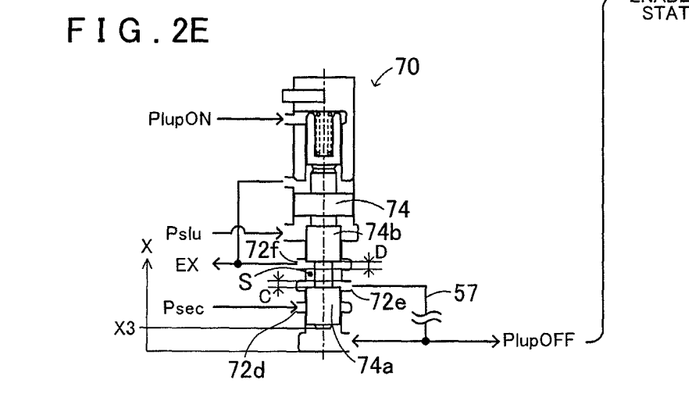

Then, when the spool 74 moves from the position X2 to a position X3 which is a movement end, a state shown in FIG. 2E is established through a state shown in FIG. 2D. The spool 74 is moved to the position X3 (FIG. 2E) in the case where the signal pressure with a maximum output is output from the linear solenoid SLU. This state is the same as the state with the spool 74 at the position indicated on the right half in FIG. 1. In both the states shown in FIGS. 2D and 2E, communication between the input port 72d and the output port 72e is blocked to block communication between the supply oil passage 55 and the communication oil passage 57, and communication between the output port 72e and the drain port 72f is allowed to allow communication between the communication oil passage 57 and the drain oil passage 59. However, the opening of the drain port 72f is gradually increased by the small-diameter land 74b as the spool 74 moves from the position X2 to the position X3. Therefore, the working oil in the communication oil passage 57 (space S) is discharged in accordance with the opening area of the drain port 72f in the state shown in FIG. 2D, and the working oil in the communication oil passage 57 (space S) is discharged with the drain port 72f and the output port 72e in communication with each other with the maximum opening in the state shown in FIG. 2E. In the case where the linear solenoid SLU is turned on, the spool 64 of the switching valve 60 is at the on position, and the communication oil passage 57 is in communication with the disengagement oil chamber 11b via communication between the input port 62d and the output port 62e. Thus, the working oil in the disengagement oil chamber 11b is discharged. Therefore, a state between the states shown in FIGS. 2D and 2E in which the spool 74 is in a range between the position X2 and the position X3 (which corresponds to the "third range" according to the present invention) is referred to as a "discharge-enabled state" (which corresponds to the "third state" according to the present invention). In the case where the spool 74 is at the position X3 as shown in FIG. 2E, a part of the small-diameter land 74a overlaps the output port 72e, and a part of the small-diameter land 74b overlaps the drain port 72f. The length L of the coupling portion 74d is determined such that the opening area of the output port 72e and the opening area of the drain port 72f are equal to each other, that is, an opening width C of the output port 72e and an opening width D of the drain port 72f are equal to each other, in this state. This allows the working oil in the communication oil passage 57 to be smoothly discharged via the output port 72e and the drain port 72f. The length L of the coupling portion 74d may be determined such that all the opening widths A, B, C, and D discussed above are equal to each other.

In the thus configured hydraulic control device 20, the disengaged state of the lock-up clutch 16 can be established by turning off the linear solenoid SLU. In this case, the spool 64 of the switching valve 60 is at the off position, and the spool 74 of the control valve 70 is at the position shown in FIG. 2A. This allows the secondary pressure Psec to be input to the disengagement oil chamber 11b via the input port 62b, the output port 62e, and the disengagement-oil-chamber port 12b, and allows the working oil in the engagement oil chamber 11a to be discharged (output to the object to be lubricated LUBE) via the engagement-oil-chamber port 12a, the output port 62f, and the output port 62g. Therefore, the hydraulic pressure PlupON in the engagement oil chamber 11a does not become higher than the hydraulic pressure PlupOFF in the disengagement oil chamber 11b, which disengages the lock-up clutch 16. On the other hand, the completely engaged state of the lock-up clutch 16 can be established by turning on the linear solenoid SLU with the maximum output. In this case, the spool 64 of the switching valve 60 is at the on position, and the spool 74 of the control valve 70 is at the position shown in FIG. 2E. This allows the secondary pressure Psec to be input to the engagement oil chamber 11a via the input port 62b, the output port 62*f*, and the engagement-oil-chamber port 12*a*, and allows the working oil in the disengagement oil chamber 11*b* to be discharged sequentially via the disengagement-oil-chamber port 12*b*, the output port 62*e*, the input port 62*d*, the communication oil passage 57, the output port 72*e*, and the drain port 72*f*, after which input of the working oil to the disengagement oil chamber 11*b* is stopped. Therefore, the hydraulic pressure PlupON in the engagement oil chamber 11*a* becomes higher than the hydraulic pressure PlupOFF in the disengagement oil chamber 11*b*, which engages the lock-up clutch 16.

Figure 3:
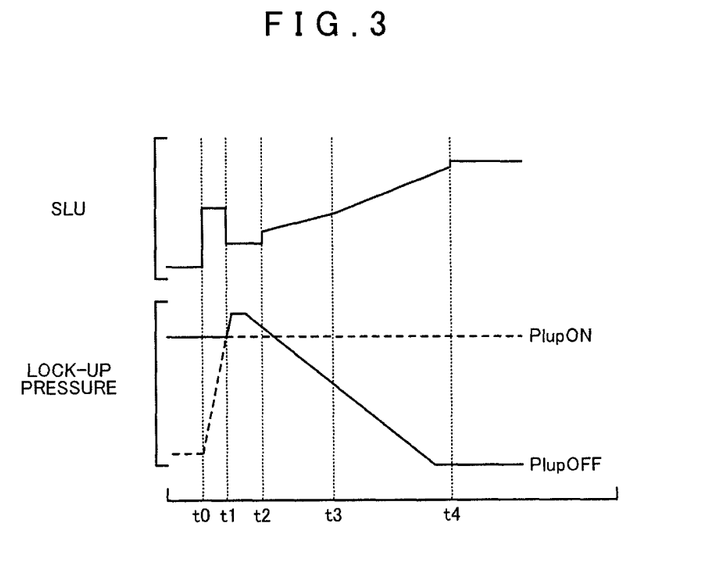
FIG. 3 illustrates temporal variations in current command for a linear solenoid SLU, hydraulic pressure PlupON acting on an engagement oil chamber 11a, and hydraulic pressure PlupOFF acting on a disengagement oil chamber 11b.

Now, a case where the lock-up clutch 16 is turned from off to on is considered. In the embodiment, the lock-up clutch 16 is turned on, from a state in which the lock-up clutch 16 is turned off, that is, from a state in which the secondary pressure Psec is input to the disengagement oil chamber 11*b* and discharged from the engagement oil chamber 11*a*, by establishing a state in which the secondary pressure Psec is input to (acts on) the engagement oil chamber 11*a* and the disengagement oil chamber 11*b*, standing by in such a state, and thereafter gradually discharging the working oil in the disengagement oil chamber 11*b*. Temporal variations in current command for the linear solenoid SLU, hydraulic pressure PlupON (dotted line) acting on the engagement oil chamber 11*a*, and hydraulic pressure PlupOFF (solid line) acting on the disengagement oil chamber 11*b* are shown in FIG. 3.

First, the controller 30 turns from off to on the linear solenoid SLU to perform fast fill (time t0) in order to establish a low-pressure standby state for standby at a low pressure (time t1). As a result of the fast fill, the oil passages leading to the linear solenoid SLU are filled with working oil. At this time, the signal pressure from the linear solenoid SLU is input to move the spool 64 of the switching valve 60 from the off position to the on position. This allows communication between the input port 62*b* and the output port 62*f* to input the secondary pressure Psec to the engagement oil chamber 11*a*, which increases the hydraulic pressure PlupON in the engagement oil chamber 11*a*. Also, communication between the input port 62*d* and the output port 62*e* is allowed to allow communication between the disengagement oil chamber 11*b* and the communication oil passage 57. Immediately after start of the input of the signal pressure from the linear solenoid SLU, the control valve 70 is in the supply-enabled state, and the secondary pressure Psec is input to the disengagement oil chamber 11*b*. Since the secondary pressure Psec is charged in the communication oil passage 57 while the linear solenoid SLU is turned off as discussed above, the hydraulic pressure PlupOFF in the disengagement oil chamber 11*b* varies without dropping. Then, when the secondary pressure Psec is input to both the engagement oil chamber 11*a* and the disengagement oil chamber 11*b* so that the secondary pressure Psec acts on both the feedback ports 72*b* and 72*c*, the control valve 70 is brought into the supply/discharge-disabled state shown in FIG. 2B. A temporary rise in hydraulic pressure PlupOFF is observed during low-pressure standby (time t1 to time t2), and will be discussed in detail later.

When the low-pressure standby state is terminated at time t2, current control is performed such that the signal pressure from the linear solenoid SLU increases in accordance with a predetermined pattern. This allows the control valve 70 to be switched from the supply/discharge-disabled state to the discharge-enabled state shown in FIG. 2D through the state shown in FIG. 2C, which allows the working oil to be discharged from the disengagement oil chamber 11*b* in accordance with the opening area of the drain port 72*f*. Therefore, the hydraulic pressure PlupOFF decreases, which gradually increases the pressure difference between the hydraulic pressure PlupOFF and the hydraulic pressure PlupON. Thus, at and after time t3, at which a predetermined time has elapsed from time t2, the signal pressure from the linear solenoid SLU is controlled so as to be further increased along with feedback control for bringing the difference between the rotational speed of the pump impeller 13 on the input side (crankshaft of the engine) and the rotational speed of the turbine runner 14 on the output side (input shaft of the automatic transmission) to a target value. When the difference between the rotational speeds reaches a predetermined value by performing such control, a maximum current is output from the linear solenoid SLU (time t4), and the lock-up clutch 16 is engaged. Thus, the lock-up clutch 16 can be smoothly engaged by gradually increasing the pressure difference between the hydraulic pressure PlupON and the hydraulic pressure PlupOFF by gradually discharging the working oil in the disengagement oil chamber 11*b* after standing by with the secondary pressure Psec input to (acting on) both the engagement oil chamber 11*a* and the disengagement oil chamber 11*b*.

Figure 4:
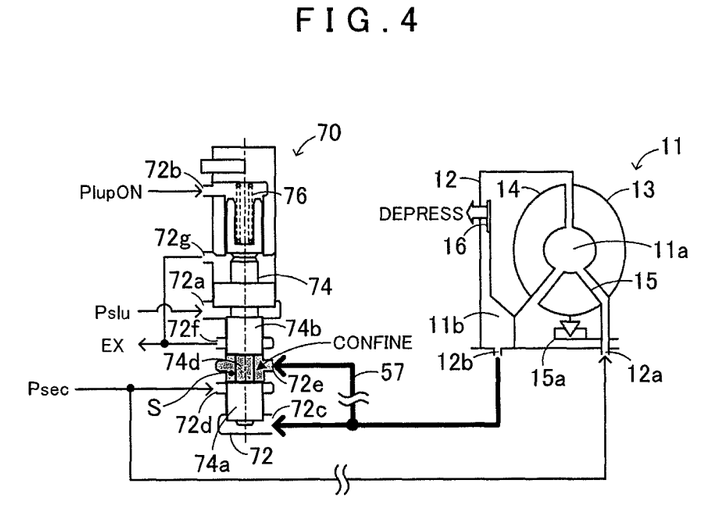
FIG. 4 illustrates the influence of a centrifugal oil pressure acting on a lock-up clutch 16.

Next, the reason for the temporary rise in hydraulic pressure PlupOFF during low-pressure standby will be described. The lock-up clutch 16 is intended to eliminate a loss in torque transfer by directly coupling the pump impeller 13 on the input side and the turbine runner 14 on the output side to each other. In the related art, the lock-up clutch 16 is engaged after the difference in rotational speed between the pump impeller 13 and the turbine runner 14 has become relatively small. In response to a request to further improve the power transfer efficiency in recent years, however, the range of the engagement of the lock-up clutch 16 has been expanded even to a case where the difference in rotational speed between the input side and the output side is relatively large, such as immediately after the vehicle starts traveling, for example. When the control discussed above is performed to turn from off to on the lock-up clutch 16 in such an expanded range, however, a larger centrifugal force (hereinafter referred to as a "centrifugal oil pressure") may act on the working oil in the vicinity of the pump impeller 13 and the converter cover 12 on the input side than on the working oil in the vicinity of the turbine runner 14 and the lock-up clutch 16 on the output side since the difference in rotational speed between the input side and the output side is relatively large. FIG. 4 illustrates the influence of the centrifugal oil pressure acting on the lock-up clutch 16. As shown in the drawing, as the centrifugal oil pressure on the input side becomes higher, the lock-up clutch 16 is depressed leftward in FIG. 4. When the hydraulic pressure PlupOFF in the disengagement oil chamber 11*b* is increased as a result of such depression, a feedback force exceeding the secondary pressure Psec is input to the feedback port 72*c* to which the hydraulic pressure PlupOFF is input as a feedback force. When such a feedback force acts on the spool 74 during low-pressure standby, the spool 74 may move from the supply/discharge-disabled state shown in FIG. 2B to be switched to the discharge-enabled state. In the embodiment, however, the spool 74 is required to move over a distance exceeding the amount of movement α before being switched from the supply/discharge-disabled state shown in FIG. 2B to the discharge-enabled state shown in FIG. 2D, and thus can be maintained in the supply/discharge-disabled state rather than being switched to the discharge-enabled state. Since the supply/discharge-disabled state can be maintained, the working oil can be confined in the space S (including the communication oil passage 57). Therefore, when the lock-up clutch 16 is depressed, the hydraulic pressure of the working oil confined in the space S is increased to apply a resistive force against such depression, which prevents the lock-up clutch 16 from being excessively depressed. The temporary rise in hydraulic pressure PlupOFF during low-temperature standby is caused under the influence of such depression of the lock-up clutch 16 due to the centrifugal oil pressure.

In contrast, in a configuration in which the amount of movement α is not secured so that the control valve 70 is switched from the supply/discharge-disabled state to the discharge-enabled state immediately upon an increase in feedback force, the working oil cannot be confined in the space S, unlike in the embodiment, and thus depression of the lock-up clutch 16 cannot be resisted. Therefore, when a centrifugal oil pressure acts to depress the lock-up clutch 16 during low-pressure standby, the spool 74 is moved into the discharge-enabled state to open the drain port 74f. Thus, the working oil in the disengagement oil chamber 11b is discharged to abruptly engage the lock-up clutch 16, which may produce an engagement shock. In the embodiment, the working oil is confined in the space S to prevent the working oil in the disengagement oil chamber 11b from being discharged. Thus, it is possible to suppress occurrence of such an engagement shock of the lock-up clutch 16. In order to avoid the influence of the centrifugal oil pressure, it is conceivable to make the hydraulic pressure input to the engagement oil chamber 11a and the hydraulic pressure input to the engagement oil chamber 11b during low-pressure standby different from each other. However, this requires that a hydraulic pressure that is different from the secondary pressure Psec should be generated, which complicates the device configuration. In the embodiment, the same secondary pressure Psec is used to control the lock-up clutch 16, and the length L of the coupling portion 74d of the spool 74 is determined such that the working oil can be confined in the space S. Thus, the device configuration is not complicated. Then, the length L of the coupling portion 74 is determined such that the opening areas of the input port 72d and the output port 72e are equal to each other in the case where the spool 74 is positioned at the initial position X0 in the supply-enabled state, and such that the opening areas of the output port 72e and the drain port 72f are equal to each other in the case where the spool 74 is positioned at the position X3 in the discharge-enabled state, so that the working oil can smoothly flow into and out of the space S. Thus, the controllability of the hydraulic pressure is not adversely affected even in the case where the length L of the coupling portion 74 is determined such that the working oil can be confined in the space S. This is the reason that the coupling portion 74d, which couples the small-diameter lands 74a and 74b of the spool 74 of the control valve 70 to each other, has such a length L that allows the working oil to be confined in the space S and that allows the working oil to smoothly flow into and out of the space S.

In the fluid pressure control device according to the embodiment described above, the control valve 70 is configured to switch between the supply/discharge-disabled state, in which the working oil is not supplied to or discharged from the space S defined by the small-diameter lands 74a and 74b and the coupling portion 74d of the spool 74 and the inner wall of the sleeve 72, and the discharge-enabled state, in which the working oil output from the disengagement oil chamber 11b and input to the space S is discharged, through movement of the spool 74 over a distance exceeding the amount of movement α. Thus, even in the case where a centrifugal oil pressure acts to depress the lock-up clutch 16 toward the disengagement oil chamber 11b so that a feedback force exceeding the secondary pressure Psec acts on the spool 74 during standby with the secondary pressure Psec input to both the engagement oil chamber 11a and the disengagement oil chamber 11b when the lock-up clutch 16 of the torque converter 11 is turned from off to on, the discharge-enabled state is not established but the supply/discharge-disabled state is maintained to confine the working oil in the space S, and the confined working oil applies a resistive force against the depression of the lock-up clutch 16, which prevents the lock-up clutch 16 from being excessively depressed. Therefore, the working oil in the disengagement oil chamber 11b is discharged to prevent the lock-up clutch 16 from being engaged. Thus, it is possible to suppress occurrence of an engagement shock of the lock-up clutch 16 due to the centrifugal oil pressure.

In the embodiment, the length L of the coupling portion 74 is determined such that the opening area of the input port 72d and the opening area of the output port 72e are equal to each other, that is, the opening width A of the input port 72d and the opening width B of the output port 72e are equal to each other, with the spool 74 positioned at the initial position X0. However, the present invention is not limited thereto, and the length L of the coupling portion 74 may be determined without making the opening areas of the input port 72d and the output port 72e equal to each other. Also, the length L of the coupling portion 74 is determined such that the opening area of the output port 72e and the opening area of the drain port 72f are equal to each other, that is, the opening width C of the output port 72e and the opening width D of the drain port 72f are equal to each other, with the spool 74 positioned at the position X3. However, the present invention is not limited thereto, and the length L of the coupling portion 74 may be determined without making the opening areas of the output port 72e and the drain port 72f equal to each other.

In the embodiment, the hydraulic pressure of the torque converter 11 mounted on an automobile is controlled. However, the present invention is not limited thereto, and the fluid pressure of a torque converter that transfers power via a working fluid and that includes a lock-up clutch that is engaged by a pressure difference between fluid pressures may be controlled. Also, the fluid pressure of a torque converter mounted on a movable body such as a vehicle other than an automobile, a ship, and an airplane may be controlled, or the fluid pressure of a torque converter mounted on a stationary device may be controlled.

The correspondence between the main elements of the embodiment and the main elements of the invention described in the "SUMMARY OF THE INVENTION" section will be described. In the embodiment, the torque converter 11 corresponds to the "fluid transfer device". The linear solenoid SLU corresponds to the "signal pressure output valve". The control valve 70 corresponds to the "control valve". The switching valve 60 corresponds to the "switching valve". The controller 30 corresponds to the "control unit". The small-diameter land 74a corresponds to the "first land". The small-diameter land 74b corresponds to the "second land". The coupling portion 74d corresponds to the "reduced-diameter portion". The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and spirit of the present invention.

The present invention may be applied to the automotive industry.

What is claimed is:

1. A fluid pressure control device that controls input and output of a fluid pressure to and from a fluid chamber in a fluid transfer device that transfers power from a motor via a working fluid in the fluid chamber, the fluid chamber being partitioned into an engagement oil chamber and a disengagement oil chamber by a lock-up clutch, the lock-up clutch being turned off by inputting the fluid pressure to the disengagement oil chamber and discharging the fluid pressure from the engagement oil chamber, and the lock-up clutch being turned on by stopping input of the fluid pressure to the disengagement oil chamber and inputting the fluid pressure to the engagement oil chamber, the fluid pressure control device comprising:

a signal pressure output valve that performs pressure regulation to output a signal pressure;

a control valve that is connected to an output source flow passage leading to an output source of the fluid pressure, a disengagement-oil-chamber flow passage leading to the disengagement oil chamber, and a drain passage, and that switchably establishes, in accordance with the signal pressure from the signal pressure output valve, a first state in which communication between the output source flow passage and the disengagement-oil-chamber flow passage is allowed and communication between the disengagement-oil-chamber flow passage and the drain passage is blocked, a second state in which communication between the output source flow passage and the disengagement-oil-chamber flow passage is blocked and communication between the disengagement-oil-chamber flow passage and the drain passage is blocked, and a third state in which communication between the output source flow passage and the disengagement-oil-chamber flow passage is blocked and communication between the disengagement-oil-chamber flow passage and the drain passage is allowed; and a control unit that controls the signal pressure output valve such that the control valve establishes the first state when the lock-up clutch is turned off, controlling the signal pressure output valve such that the control valve establishes the third state when the lock-up clutch is turned on, and controlling the signal pressure output valve such that the control valve establishes the second state so that the working fluid can be confined in the disengagement oil chamber when the lock-up clutch is switched from off to on.

2. The fluid pressure control device according to claim 1, further comprising a switching valve that switches to a state in which communication through a flow passage linking the output source and the engagement oil chamber to each other is blocked when the lock-up clutch is turned off, and that switches to a state in which communication through the flow passage linking the output source and the engagement oil chamber to each other is allowed when the lock-up clutch is turned on.

3. The fluid pressure control device according to claim 1, wherein the control valve includes a spool that can switch between the first, second and third states, the spool being positioned at one movement end of a movable range in an initial state and being movable from the one movement end to an other movement end by applying to the spool not only the signal pressure from the signal pressure output valve but also the fluid pressure in the disengagement oil chamber, as a feedback force, in the same direction as a direction of application of the signal pressure, and the first state being established when the spool is positioned in a first range including the one movement end of the movable range, the third state being established when the spool is positioned in a third range including the other movement end, and the second state being established when the spool is positioned in a second range provided between the first range and the third range, the second range being determined such that the second state is established when the fluid pressure from the output source is applied as the feedback force, in addition to the signal pressure from the signal pressure output valve, when the lock-up clutch is switched from off to on, and such that the second state is maintained even when a fluid pressure exceeding the fluid pressure from the output source is applied as the feedback force.

4. The fluid pressure control device according to claim 3, wherein the control unit is a unit that controls the signal pressure output valve such that the control valve switches from the first state to the second state, stands by in the second state, and thereafter switches to the third state so that the fluid pressure from the output source is applied to both the engagement oil chamber and the disengagement oil chamber, and thereafter is discharged from the disengagement oil chamber when the lock-up clutch is switched from off to on.

5. The fluid pressure control device according to claim 3, wherein the control valve is formed with an input port connected to the output source flow passage, an output port connected to the disengagement-oil-chamber flow passage, and a drain port connected to the drain passage, which are arranged in an order of the input port, the output port, and the drain port along an axial direction, and the spool is formed with a first land, a second land, and a reduced-diameter portion that couples the lands to each other, which are arranged in an order of the first land, the reduced-diameter portion, and the second land, a length of the reduced-diameter portion being determined such that the second land blocks the drain port and communication between the input port and the output port is allowed via the reduced-diameter portion when the spool is in the first range, the first land blocks the input port and communication between the output port and the drain port is allowed via the reduced-diameter portion when the spool is in the third range, and the first land blocks the input port and the second land blocks the drain port when the spool is in the second range.

6. The fluid pressure control device according to claim 5, wherein the control valve is configured such that the first land overlaps a part of the input port and the second land overlaps a part of the output port when the spool is positioned at the one movement end, and the length of the reduced-diameter portion is determined such that an opening area of the input port and an opening area of the output port are equal to each other.

7. The fluid pressure control device according to claim 5, wherein the control valve is configured such that the first land overlaps a part of the output port and the second land overlaps a part of the drain port when the spool is positioned at the other movement end, and the length of the reduced-diameter portion is determined such that an opening area of the output port and an opening area of the drain port are equal to each other.

* * * * *